(12) United States Patent
Takano et al.

(10) Patent No.: US 12,090,464 B2
(45) Date of Patent: Sep. 17, 2024

(54) METHOD FOR PRODUCING PRECURSOR OF LITHIUM ADSORBENT

(71) Applicants: SUMITOMO METAL MINING CO., LTD., Tokyo (JP); THE UNIVERSITY OF KITAKYUSHU, Kitakyushu (JP)

(72) Inventors: Masatoshi Takano, Niihama (JP); Shin-Ya Matsumoto, Niihama (JP); Osamu Ikeda, Niihama (JP); Yohei Kudo, Niihama (JP); Satoshi Asano, Niihama (JP); Kazuharu Yoshizuka, Kitakyushu (JP); Syouhei Nishihama, Kitakyushu (JP)

(73) Assignees: SUMITOMO METAL MINING CO., LTD., Tokyo (JP); THE UNIVERSITY OF KITAKYUSHU, Kitakyushu (JP)

( * ) Notice: Subject to any disclaimer, the term of this patent is extended or adjusted under 35 U.S.C. 154(b) by 993 days.

(21) Appl. No.: 16/975,036

(22) PCT Filed: Apr. 17, 2019

(86) PCT No.: PCT/JP2019/016479
§ 371 (c)(1),
(2) Date: Aug. 21, 2020

(87) PCT Pub. No.: WO2019/203274
PCT Pub. Date: Oct. 24, 2019

(65) Prior Publication Data
US 2020/0391177 A1  Dec. 17, 2020

(30) Foreign Application Priority Data

Apr. 20, 2018  (JP) ................................. 2018-081217
Nov. 16, 2018  (JP) ................................. 2018-215586
Nov. 16, 2018  (JP) ................................. 2018-215587

(51) Int. Cl.
*B01J 20/04*  (2006.01)
*B01J 20/30*  (2006.01)
(Continued)

(52) U.S. Cl.
CPC ......... *B01J 20/041* (2013.01); *B01J 20/3085* (2013.01); *C01G 45/1214* (2013.01);
(Continued)

(58) Field of Classification Search
CPC .. B01J 20/041; B01J 20/3085; C01G 45/1214
See application file for complete search history.

(56) References Cited

U.S. PATENT DOCUMENTS

| 5,135,732 A | 8/1992 | Barboux |
| 2004/0101457 A1 | 5/2004 | Pahlman |
| 2009/0142255 A1 | 6/2009 | Chung |

FOREIGN PATENT DOCUMENTS

| CN | 103272554 A | 9/2013 |
| CN | 104941569 A | 9/2015 |

(Continued)

OTHER PUBLICATIONS

International Search Report for International Application No. PCT/JP2019/016479 dated Jul. 23, 2019 (3 sheets, 2 sheets translation, 5 sheets total).
(Continued)

*Primary Examiner* — James A Fiorito
(74) *Attorney, Agent, or Firm* — Kratz, Quintos & Hanson, LLP

(57) ABSTRACT

A method for producing lithium manganese oxide that is a precursor of a lithium adsorbent under atmospheric pressure is provided. The method for producing a precursor of a lithium adsorbent comprises the following steps (1) to (3): (1) A $1^{st}$ mixing step of mixing a manganese salt and alkali hydroxide, so as to obtain a $1^{st}$ slurry containing manganese
(Continued)

(Lithium manganese oxide = precursor of lithium adsorbent)

hydroxide; (2) a $2^{nd}$ mixing step of adding lithium hydroxide to the $1^{st}$ slurry and then mixing the mixture to obtain a $2^{nd}$ slurry; and (3) an oxidation step of adding an oxidizing agent to the $2^{nd}$ slurry, so as to obtain a precursor of a lithium adsorbent. The method for producing a precursor of a lithium adsorbent comprises these steps, so that a precursor of a lithium adsorbent can be produced under atmospheric pressure. Therefore, a precursor of a lithium adsorbent can be produced at a limited cost.

3 Claims, 12 Drawing Sheets

(51) Int. Cl.
*C01G 45/12* (2006.01)
*C02F 1/28* (2023.01)
*C02F 101/10* (2006.01)

(52) U.S. Cl.
CPC .......... *C02F 1/281* (2013.01); *C01P 2002/72* (2013.01); *C01P 2004/03* (2013.01); *C02F 2101/10* (2013.01)

(56) References Cited

FOREIGN PATENT DOCUMENTS

| | | |
|---|---|---|
| JP | H01-254249 A | 10/1989 |
| JP | H06-31159 A | 2/1994 |
| JP | 2005-518938 A | 6/2005 |
| JP | 2010-58008 A | 3/2010 |

OTHER PUBLICATIONS

Written Opinion of the International Searching Authority for International Application No. PCT/JP2019/016479 dated Jul. 23, 2019 (4 sheets).

X. Li., et al.; "Preparation of Layered LiMnO2 by In Situ Oxidation Intercalation and its Mechanism and Properties"; Beijing University of Chemical Technology, Key Laboratory of Controlled Chemical Reaction Science and Technology Fundamentals, Ministry of Education; Beijing, China; Oct. 2004; Chemical Bulletin; vol. 49; No. 19; pp. 1958-1961 (4 pages,. 7 pages translation, 11 pages total).

F I G. 4
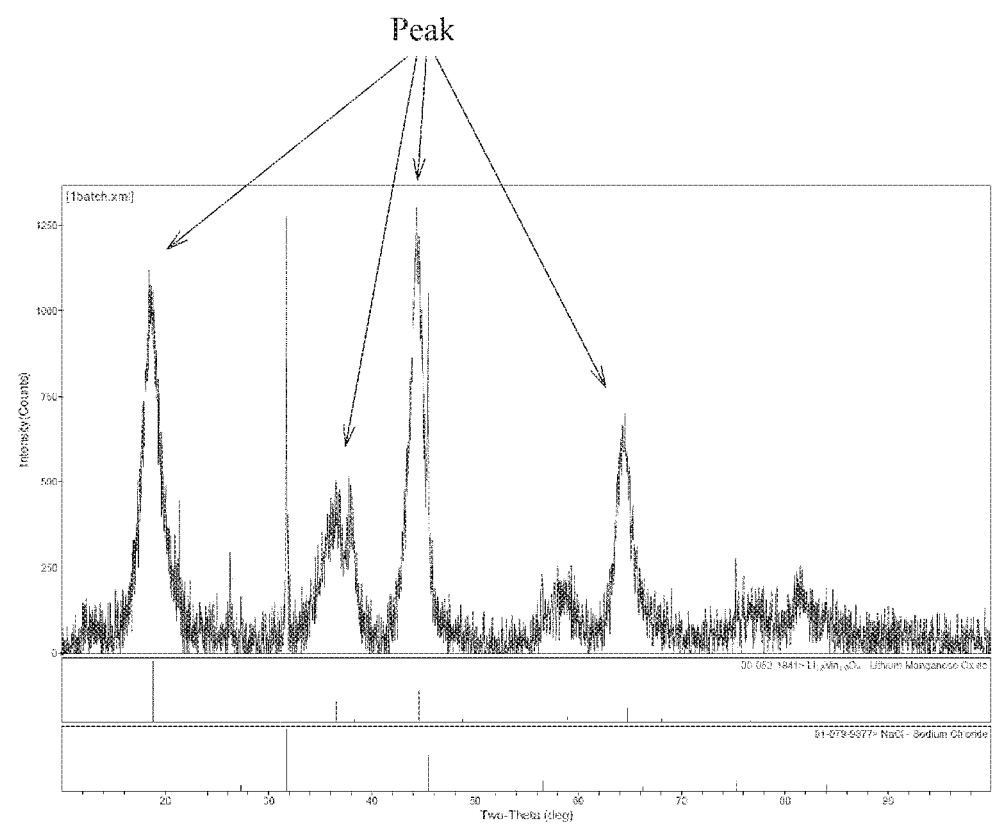

F I G. 9
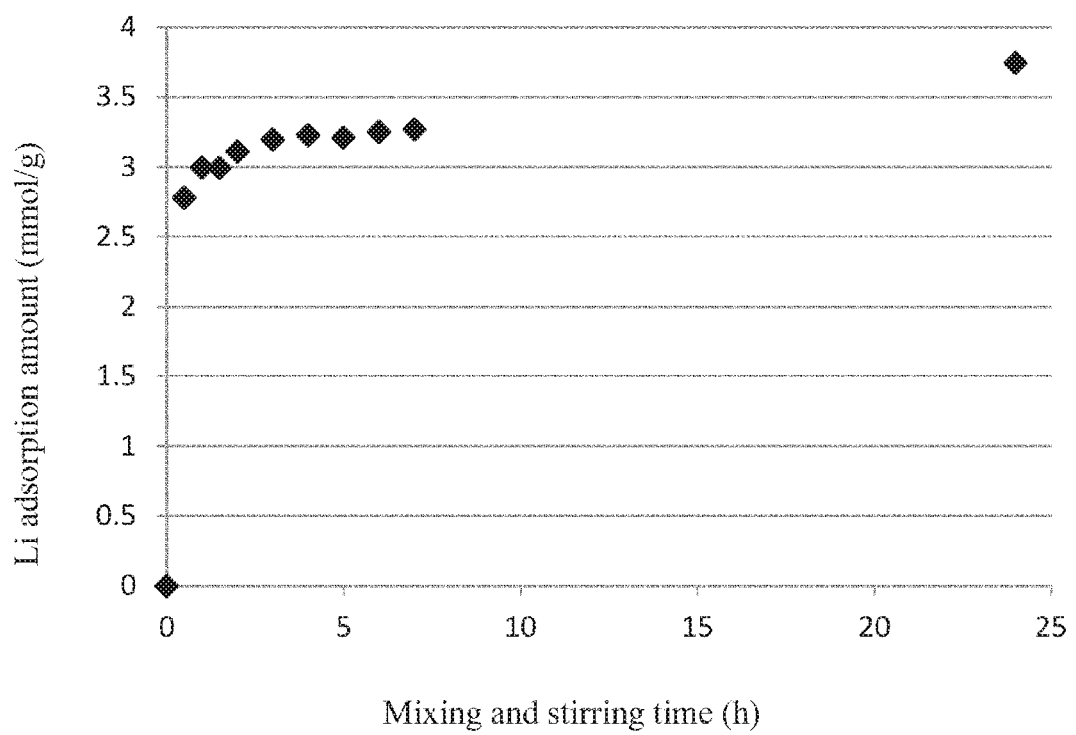

METHOD FOR PRODUCING PRECURSOR OF LITHIUM ADSORBENT

TECHNICAL FIELD

The present invention relates to a method for producing a precursor of a lithium adsorbent, and more specifically, a method for producing a precursor of a lithium adsorbent that adsorbs lithium from an aqueous solution containing lithium.

BACKGROUND ART

Lithium is broadly used in industry as, such as addition agents for ceramic or glass, glass flux for steel continuous casting, grease, pharmaceutical products, batteries, and the like. In particular, lithium ion batteries that are secondary batteries have high energy density and high voltage, and thus the applications thereof as batteries for electronic equipment such as notebook personal computers or on-vehicle batteries for electric vehicles and hybrid vehicles are currently expanding and causing a sudden surge in demand therefor. This causes a sudden increase in demand for lithium as a raw material.

Lithium has been produced in the form of lithium hydroxide or lithium carbonate by purifying salt lake brine or lithium-containing ores, such as spodumene ($Li_2O.Al_2O_3.2SiO_4$) as raw materials. However, in view of production cost, not a process of removing impurities other than lithium to cause lithium to remain in an aqueous solution, but a process of selectively collecting lithium from an aqueous solution in which impurities coexist with lithium is desired.

A known process for selectively collecting lithium alone, is a method in which lithium manganese oxide that is an inorganic adsorbent is used. Lithium manganese oxide having a spinel structure has good capacity of selectively adsorbing lithium as a result of pre-treatment; that is, lithium-hydrogen exchange via contacting with acid, and thus can be repeatedly used through adsorption and liquation in a manner similar to ion-exchange resins.

Specifically, in a process for selectively collecting lithium, lithium manganese oxide serves as a precursor of a lithium adsorbent. Examples of a method for producing the lithium manganese oxide include dry methods for producing the lithium manganese oxide by firing alone and wet methods for producing the same in aqueous solutions.

Patent literature 1 or 2 discloses a method for producing lithium manganese oxide by such a dry method. The dry method involves milling and mixing trimanganese tetroxide and lithium hydroxide, and then firing the mixture in air or in an oxygen atmosphere for preparation.

In contrast, Patent Literature 3 discloses a method for producing lithium manganese oxide by a wet method. This wet method involves preparing the lithium manganese oxide via reaction in an aqueous solution, and then performing heat treatment to accelerate crystallization reaction.

The above wet method involves mixing γ-manganese oxyhydroxide with lithium hydroxide and letting them reacted hydrothermally at 100° C. to 140° C. under pressure, so as to obtain lithium manganese oxide ($LiMn_2O_4$), and then performing heat treatment at temperatures ranging from 400° C. to 700° C., so as to oxidize trivalent manganese to tetravalent manganese, whereby lithium manganese oxide ($Li_2Mn_2O_5$) can be stably obtained without causing any structural change.

CITATION LIST

Patent Literature

[Patent Literature 1] Japanese Patent No. 3937865
[Patent Literature 2] Japanese Patent No. 5700338
[Patent Literature 3] Japanese Patent No. 3388406

SUMMARY OF INVENTION

Technical Problem

The method described in Patent Literature 3 involves performing reaction under pressurizing conditions, and thus requires a pressurization vessel such as an autoclave. However, an autoclave for commercial-scale production (for example, in the order of several tons) is an expensive facility and is problematic in high thermal cost. Moreover, an autoclave is a pressure vessel, and thus is problematic in requirement of strict control since it is under regulation by law for safety assurance.

In view of the above circumstances, an object of the present invention is to provide a method for producing lithium manganese oxide that is a precursor of a lithium adsorbent under atmospheric pressure, which requires no pressure vessel.

Solution to Problem

The method for producing a precursor of a lithium adsorbent of a 1s invention comprises the following steps (1) to (3):

(1) a $1^{st}$ mixing step: the step of mixing a manganese salt and alkali hydroxide to obtain a $1^{st}$ slurry containing a manganese hydroxide;
(2) a $2^{nd}$ mixing step: the step of adding lithium hydroxide to the $1^{st}$ slurry, and mixing the resultant to obtain a $2^{nd}$ slurry;
(3) an oxidation step: the step of adding an oxidizing agent to the $2^{nd}$ slurry to obtain an oxide.

The method for producing a precursor of a lithium adsorbent of a $2^{nd}$ invention is a method wherein in the $1^{st}$ invention, which further comprises a step of firing the oxide after the oxidation step.

The method for producing a precursor of a lithium adsorbent of the 3Rd invention is a method wherein in the $1^{st}$ invention or the $2^{nd}$ invention, the oxidizing agent is sodium hypochlorite.

The method for producing a precursor of a lithium adsorbent of a 4" invention is a method wherein in any one of the $1^{st}$ invention to the $3^{rd}$ invention, the manganese salt is manganese sulfate.

The method for producing a precursor of a lithium adsorbent of a $5^{th}$ invention is a method wherein in the $1^{st}$ invention or the $2^{nd}$ invention, the manganese salt is manganese nitrate, the alkali hydroxide is lithium hydroxide, the oxidizing agent is ammonium peroxodisulfate and/or sodium peroxodisulfate.

The method for producing a precursor of a lithium adsorbent of a $6^{th}$ invention is a method wherein in any one of the $1^{st}$ invention to the $5^{th}$ invention, the molar amount of the alkali hydroxide in the $1^{st}$ mixing step is 2 or more times and 10 or less times the molar amount of the manganese salt.

The method for producing a precursor of a lithium adsorbent of a $7^{th}$ invention is a method, wherein in any one of the $1^{st}$ invention to the $6^{th}$ invention, the molar amount of the lithium hydroxide in the $2^{nd}$ mixing step is 4 or more times and 20 or less times the molar amount of the manganese sulfate salt.

The method for producing a precursor of a lithium adsorbent of an $8^{th}$ invention is a method wherein in any one of the $1^{st}$ invention to the $7^{th}$ invention, the oxidation-reduction potential of the aqueous solution in the oxidation step is 300 mV or more and 1000 mV or less at a silver-silver chloride electrode.

The method for producing a precursor of a lithium adsorbent of a $9^{th}$ invention is a method wherein in any one of the $1^{st}$ invention to the $8^{th}$ invention, the oxidation step is performed at 50° ° C. or higher and 80° ° C. or lower.

Advantageous Efforts of Invention

According to the $1^{st}$ invention, the method comprises the $1^{st}$ mixing step, the $2^{nd}$ mixing step, and the oxidation step, so that lithium manganese oxide that is a precursor of a lithium adsorbent can be produced under atmospheric pressure. These steps can be performed under atmospheric pressure, and thus a precursor of a lithium adsorbent can be produced at a limited cost.

According to the $2^{nd}$ invention, the method further comprises a step of firing the oxide after the oxidation, so that oxidation can be performed more reliably to give an oxide.

According to the $3^{rd}$ invention, the oxidizing agent is sodium hypochlorite, so that the reaction cost can be limited because of the use of such an inexpensive material, and oxidation can be performed more reliably because of the increased oxidation capacity.

According to the $4^{th}$ invention, the manganese salt is manganese sulfate, so that the reaction cost can be limited because of the use of such an inexpensive material.

According to the $5^{th}$ invention, the manganese salt is manganese nitrate, the alkali hydroxide is lithium hydroxide, and the oxidizing agent is ammonium peroxodisulfate and/or sodium peroxodisulfate, so that a precursor of a lithium adsorbent can be produced more reliably.

According to the $6^{th}$ invention, the molar amount of the alkali hydroxide in the $1^{st}$ mixing step is 2 or more times and 10 or less times the molar amount of the manganese salt, so that the amount of the alkali hydroxide to be used can be lowered and thus the cost can be limited, and the total amount of the manganese salt can be completely used to give lithium manganese oxide.

According to the $7^{th}$ invention, the molar amount of the lithium hydroxide in the $2^{nd}$ mixing step is 4 or more times and 20 or less times the molar amount of the manganese sulfate salt, so that the amount of the lithium hydroxide to be used can be lowered and thus the cost can be limited, and lithium can be intercalated reliably.

According to the $8^{th}$ invention, the oxidation-reduction potential of the aqueous solution in the oxidation step is 300 mV or more and 1000 mV or less at a silver-silver chloride electrode, so that no special facility capable of working with high potential is required and thus the facility cost can be limited, and the manganese hydroxide obtained in $1^{st}$ mixing step can be completely used to give lithium manganese oxide.

According to the $9^{th}$ invention, the oxidation step is performed at 50° ° C. or higher and 80° ° C. or lower, so that no special facility capable of working with high temperatures is required and thus the facility cost can be limited, and the rate of reaction can be effectively increased in the oxidation step, by which lithium manganese oxide is generated through lithium intercalation.

BRIEF DESCRIPTION OF DRAWINGS

FIG. 4 is a graph showing the results of measuring X-ray diffraction of a precursor of a lithium adsorbent, lithium manganese oxide, obtained in the production method in FIG. 1.

FIG. 9 is a graph showing the lithium adsorption amount of a precursor of a lithium adsorbent, lithium manganese oxide, obtained in the production method in FIG. 2, with respect to the mixing and stirring time.

DESCRIPTION OF EMBODIMENTS

Figure 1:
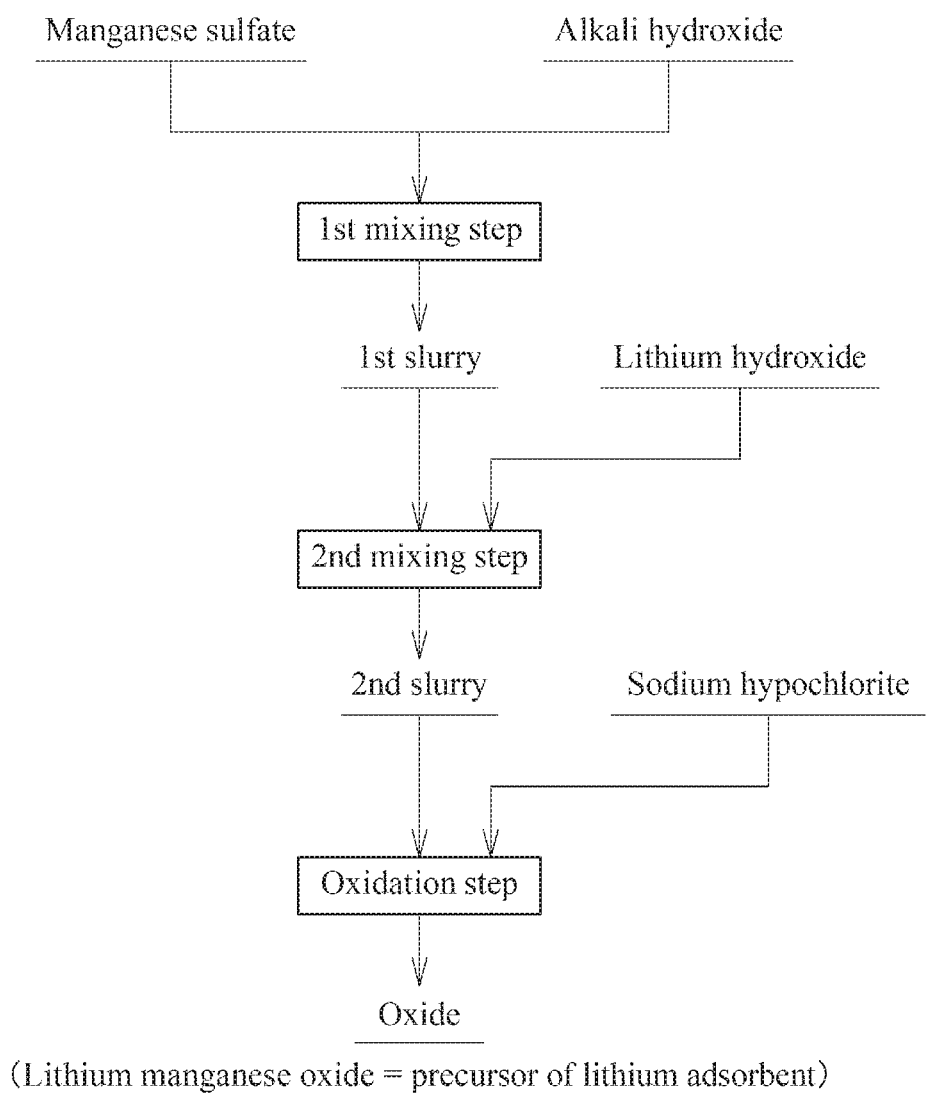
FIG. 1 is a flow chart showing the method for producing a precursor of a lithium adsorbent according to a $1^{st}$ embodiment of the present invention.

The embodiments of the present invention are as described below on the basis of drawings. However, the following embodiments illustrate the method for producing a precursor of a lithium adsorbent for realization of the technical idea of the present invention, and thus the present invention does not intend to limit the method for producing a precursor of a lithium adsorbent to the following embodiments.

The method for producing a precursor of a lithium adsorbent according to the present invention comprises the following steps (1) to (3):

(1) a $1^{st}$ mixing step of mixing a manganese salt and alkali hydroxide to obtain a $1^{st}$ slurry containing a manganese hydroxide;

(2) a $2^{nd}$ mixing step of adding lithium hydroxide to the $1^{st}$ slurry, and mixing the mixture to obtain a $2^{nd}$ slurry; and (3) an oxidation step of adding an oxidizing agent to the $2^{nd}$ slurry to obtain an oxide.

The method for producing a precursor of a lithium adsorbent comprises the above (1) $1^{st}$ mixing step, (2) $2^{nd}$ mixing step, and (3) oxidation step, so that lithium manganese oxide; that is, a precursor of a lithium adsorbent can be produced. These steps can be performed under atmospheric pressure, so that any expensive facility such as an autoclave is not used and a precursor of a lithium adsorbent can be produced while limiting the running cost such as thermal cost. Furthermore, this lowers the need of taking legal regulations on the use of high pressure devices such as autoclaves into consideration.

Furthermore, in the method for producing a precursor of a lithium adsorbent according to the present invention, the method further comprises a step of firing the oxide after the oxidation step. The method further comprises a step of firing the oxide after the oxidation step, so that oxidation is more reliably performed to give an oxide.

Furthermore, in the method for producing a precursor of a lithium adsorbent according to the present invention, the oxidizing agent is preferably sodium hypochlorite. The oxidizing agent is sodium hypochlorite, so that the reaction cost is limited because of the use of such an inexpensive material, as well as the thus increased oxidation capacity enables more reliable oxidation.

Furthermore, in the method for producing a precursor of a lithium adsorbent according to the present invention, the manganese salt is preferably manganese sulfate. The manganese salt is manganese sulfate, so that the reaction cost can be limited because of the use of such an inexpensive material.

Furthermore, in the method for producing a precursor of a lithium adsorbent according to the present invention, the manganese salt is preferably manganese nitrate, the above alkali hydroxide is preferably lithium hydroxide, and the above oxidizing agent is preferably ammonium peroxodisulfate and/or sodium peroxodisulfate. The manganese salt is manganese nitrate, the alkali hydroxide is lithium hydroxide, and the oxidizing agent is ammonium peroxodisulfate and/or sodium peroxodisulfate, so that a precursor of a lithium adsorbent can be produced more reliably.

Furthermore, in the method for producing a precursor of a lithium adsorbent according to the present invention, the molar amount of the alkali hydroxide in the $1^{st}$ mixing step is preferably 2 or more times and 10 or less times the molar amount of the manganese salt used in $1^{st}$ mixing step. This leads to a decrease in the amount of the alkali hydroxide to be used, so as to be able to reduce the cost, as well as the total amount of the manganese salt used herein can be consumed to give the lithium manganese oxide.

Furthermore, in the method for producing a precursor of a lithium adsorbent according to the present invention, the molar amount of the lithium hydroxide in the $2^{nd}$ mixing step is preferably 4 or more times and 20 or less times the molar amount of the manganese salt in the $1^{st}$ mixing step. This leads to a decrease in the amount of the lithium hydroxide to be used so as to be able to limit the cost, as well as lithium can be intercalated more reliably.

Furthermore, in the method for producing a precursor of a lithium adsorbent according to the present invention, the oxidation-reduction potential of the aqueous solution in the oxidation step is preferably 300 mV or more and 1000 mV or less at a silver-silver chloride electrode. This makes it possible to require no special facility capable of working with high potential, and thus to reduce the facility cost, as well as the total amount of the manganese hydroxide obtained in the $2^{nd}$ mixing step can be used to give lithium manganese oxide.

Furthermore, in the method for producing a precursor of a lithium adsorbent according to the present invention, the oxidation step is preferably performed at 50° C. or higher and 80° C. or lower. This makes it possible to require no special facility capable of working with high temperatures and thus to limit the facility cost, as well as the reaction rate can be effectively increased in the oxidation step wherein lithium manganese oxide is generated through lithium intercalation.

$1^{st}$ Embodiment

<$1^{st}$ Mixing Step>

FIG. 1 shows the method for producing a precursor of a lithium adsorbent according to the $1^{st}$ embodiment of the present invention. As shown in FIG. 1, the $1^{st}$ mixing step involves mixing manganese sulfate and alkali hydroxide to obtain the $1^{st}$ slurry containing manganese hydroxide. The $1^{st}$ mixing step is a step for neutralization. Note that the $1^{st}$ slurry is obtained by mixing an aqueous solution containing manganese sulfate and an aqueous solution containing alkali hydroxide, or a solution or an aqueous solution which is obtained by mixing solids such as reagents, and then dissolving the mixture in a solvent such as water. A case of mixing aqueous solutions is as described below.

A method for preparing an aqueous solution containing manganese sulfate, and an aqueous solution containing alkali hydroxide is not particularly limited. For example, when $MnSO_4.5H_2O$ is used and sodium hydroxide is used as one of alkali hydroxides, an aqueous solution is prepared by dissolving a hydrate such as $NaOH.H_2O$ in water.

The concentrations of both aqueous solutions are not particularly limited. However, the concentration should be at the same or lower than the solubility in order to prepare an aqueous solution. The solubility of manganese sulfate in water is about 63 g/100 g-$H_2O$ at 20° C. Similarly, when sodium hydroxide is employed as one of alkalis, the solubility of the sodium hydroxide is about 109 g/100 g-$H_2O$ at 20° C. Moreover, when lithium hydroxide is employed as one of alkalis, the solubility of the lithium hydroxide is about 12 g/100 g-$H_2O$ at 20° C. The concentrations of the aqueous solutions are determined in view of these solubilities.

Through mixing of an aqueous solution containing manganese sulfate and an aqueous solution containing sodium hydroxide, the $1^{st}$ slurry containing manganese hydroxide is obtained (see [Formula 1]).

$$MnSO_4 + 2NaOH \rightarrow Mn(OH)_2 + 2NaSO_4 \quad \text{[Formula 1]}$$

Note that the molar amount of the alkali hydroxide to be added is theoretically required to be 2 times the molar amount of the manganese sulfate. Hence, in order to reliably perform reaction, the molar amount of the alkali hydroxide is preferably an equivalent amount; that is, 2 or more times the molar amount of the manganese sulfate. Furthermore, when the cost required for the alkali hydroxide to be added is taken into consideration, the molar amount of the alkali hydroxide is preferably 10 or less times the molar amount of the manganese sulfate.

Note that in Formula 1, sodium hydroxide is used as one of alkali hydroxides, but alkali hydroxides are not particularly limited thereto as long as they are capable of neutralizing manganese sulfate. For example, lithium hydroxide, potassium hydroxide or the like can be used.

Furthermore, in the embodiment, manganese sulfate is used in the 1$^{st}$ mixing step, but other manganese salts may also be used.

<2$^{nd}$ Mixing Step>

The 2$^{nd}$ mixing step involves adding lithium hydroxide to the 1$^{st}$ slurry obtained in the 1$^{st}$ mixing step and then mixing the mixture to obtain the 2$^{st}$ slurry. Mer manganese hydroxide is generated in the 1$^{st}$ mixing step, lithium hydroxide is added as a lithium manganese oxide source. The lithium hydroxide may be added in the form of aqueous solution with no problem, but it is preferably added in the form of solid in order to prevent the liquid volume from increasing.

The Li/Mn ratio of lithium manganese oxide having high adsorption capacity as a Li adsorbent is known to be 0.5 or more times and 1.0 or less times that of LiMn$_2$O$_4$. For example, the Li/Mn ratio of Li$_{1.6}$Mn$_{1.6}$O$_4$ is 1.0.

With respect to the molar amount of the manganese sulfate used in the 1$^{st}$ mixing step, the molar amount of the lithium hydroxide should be determined in view of the above ratios. However, in order to reliably perform lithium intercalation, the molar amount of the lithium hydroxide in the 2$^{nd}$ mixing step is preferably 4 or more times the molar amount of the manganese sulfate in the 1$^{st}$ mixing step. Moreover, when the cost required for the lithium hydroxide to be added is taken into consideration, the molar amount of the lithium hydroxide is preferably 20 or less times the molar amount of the manganese sulfite.

In addition, when the alkali hydroxide in 1$^{st}$ mixing step is lithium hydroxide, the 1$^{st}$ mixing step may be omitted.

<Oxidation Step>

The oxidation step involves adding sodium hypochlorite to the 2$^{nd}$ slurry obtained in the 2$^{nd}$ mixing step to obtain an oxide. Note that the sodium hypochlorite may be added in the form of solid such as crystal, or in the of aqueous solution or the like in which it is dissolved in advance.

The sodium hypochlorite is added to the 2$^{nd}$ slurry obtained in the 2$^{nd}$ mixing step, so that an oxide, lithium manganese oxide; that is, a precursor of a lithium adsorbent, is obtained (see [Formula 2]).

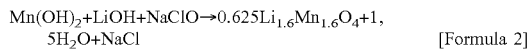

Mn(OH)$_2$+LiOH+NaClO→0.625Li$_{1.6}$Mn$_{1.6}$O$_4$+1, 5H$_2$O+NaCl  [Formula 2]

The oxidation-reduction potential of the aqueous solution in the oxidation step is preferably 300 mV or more and 1000 mV or less at a silver-silver chloride electrode. When the oxidation-reduction potential is less than 300 mV, the total amount of the manganese hydroxide obtained in the 1$^{st}$ mixing step may not be used to give lithium manganese oxide. Also, when the oxidation-reduction potential is higher than 1000 mV, the facility for the oxidation step is required to be resistant to such high oxidation-reduction potential.

The oxidation-reduction potential of the aqueous solution in the oxidation step is 300 mV or more and 1000 mV or less at a silver-silver chloride electrode, so that no special facility capable of working with high potential is required and thus the facility cost can be limited, and the total amount of the manganese hydroxide obtained in 2$^{nd}$ mixing step can be used to give lithium manganese oxide.

Note that in the oxidation step, the sodium hypochlorite is preferably added gradually in small quantities. The sodium hypochlorite is consumed when manganese is oxidized. Addition of the sodium hypochlorite causes a temporary increase in oxidation-reduction potential. However, the sodium hypochlorite is consumed as manganese is oxidized, along which the oxidation-reduction potential decreases. The sodium hypochlorite is added in such a manner that the oxidation-reduction potential is 300 mV or more.

Furthermore, the oxidation step is preferably performed at 50° C. or higher and 80° C. or lower, and further preferably at 60° C. or higher and 80° C. or lower. In the oxidation step, lithium is intercalated, so that lithium manganese oxide is generated. When the temperature for the oxidation step is lower than 50° C., the reaction rate for intercalation is not sufficiently increased. Moreover, when the temperature for the oxidation step is higher than 80° C., the facility for the oxidation step should be resistant to temperatures higher than 80° C.

The oxidation step is performed at 50° C. or higher and 80° C. or lower, so that no special facility capable of working with high temperatures is required, and thus the facility cost is limited, as well as the reaction rate can be effectively increased in the oxidation step wherein lithium manganese oxide is generated through lithium intercalation.

Furthermore, the oxidizing agent, sodium hypochlorite, is preferably added to the 2$^{nd}$ slurry kept at a temperature of 50° C. or higher and 80° C. or lower. The mixture is stirred under the conditions, and thus manganese in the solution is oxidized.

Note that pressure to be employed in the oxidation step may be atmospheric pressure with no problem and no pressurization is required. Further, stirring and mixing are preferably continued at the above temperature for 3 or more hours for reliable generation of an oxide, lithium manganese oxide.

An oxide generated in the oxidation step, lithium manganese oxide; that is, a precursor of a lithium adsorbent, undergoes solid-liquid separation to be powdered.

Note that in the oxidation step of the present invention, sodium hypochlorite is used as an oxidizing agent, but other oxidizing agents can also be used. Specifically, oxoacid of chlorine (e.g., hypochlorous acid and chlorous acid) and salts thereof (e.g., sodium salt and potassium salt), chlorine and the like can be used.

<Preparation of Adsorbent>

According to the above steps, lithium manganese oxide, which is a precursor of an excellent lithium adsorbent, can be obtained. The thus obtained lithium manganese oxide is brought into contact with acid such as hydrochloric acid for lithium-hydrogen exchange reaction to give H$_x$Mn$_y$O$_4$ (for example, X=1.6, Y=1.6, or X=1.33, Y=1.67), enabling selective adsorption of lithium.

2$^{nd}$ Embodiment

Figure 2:
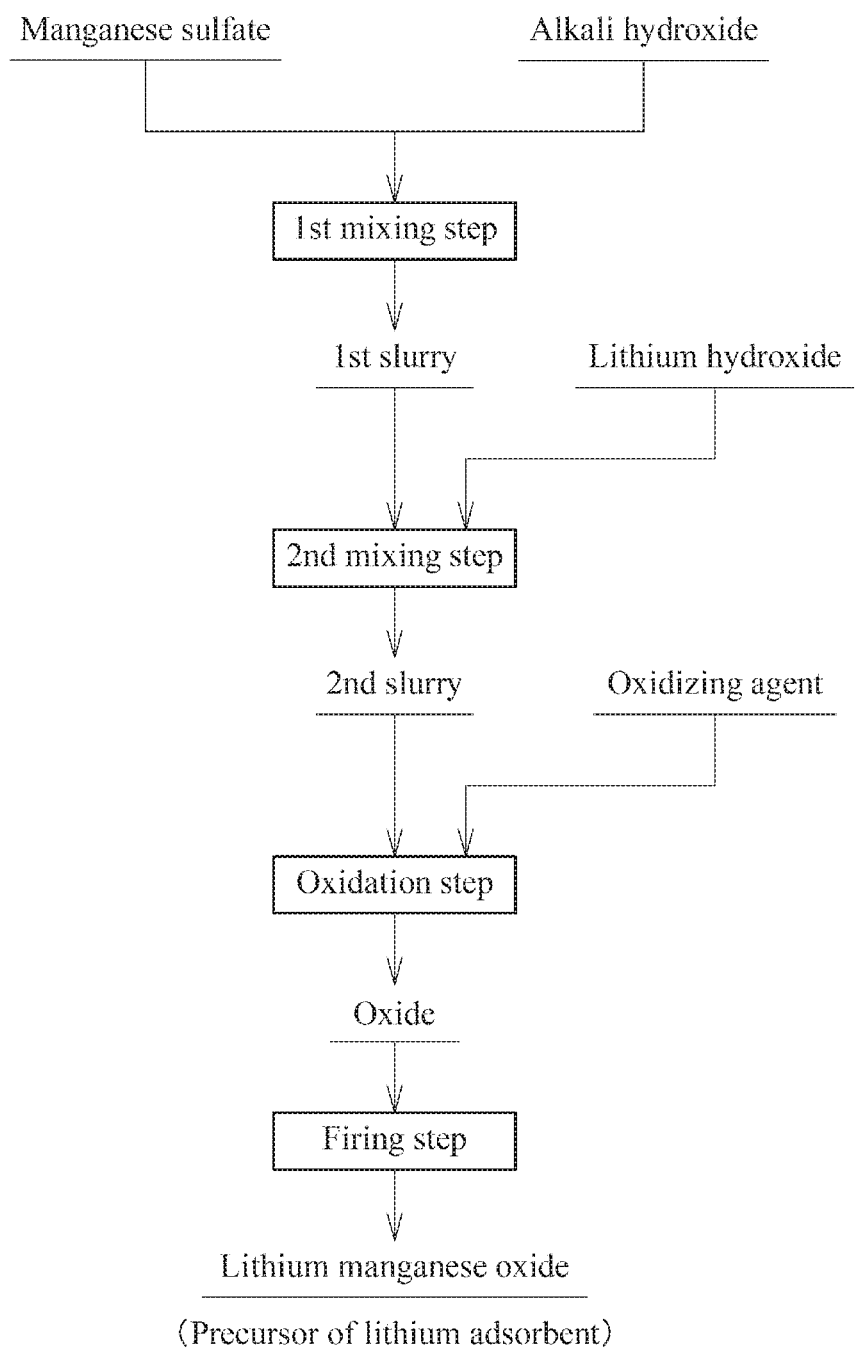
FIG. 2 is a flow chart showing the method for producing a precursor of a lithium adsorbent according to a $2^{nd}$ embodiment of the present invention.

FIG. 2 shows the method for producing a precursor of a lithium adsorbent according to the 2$^{nd}$ embodiment of the present invention. As shown in FIG. 2, a difference between the 1$^{st}$ and the 2$^{nd}$ embodiments is that the method comprises a step of firing after the oxidation step. Description of the 2$^{nd}$ embodiment mentions only a difference between the 1$^{st}$ and the 2$^{nd}$ embodiments. Hence, portions, descriptions of which are omitted herein, are the same as those in the 1$^{st}$ embodiment.

<Firing Step>

The firing step involves firing the oxide obtained in the oxidation step to obtain a precursor of a lithium adsorbent.

The oxide obtained in the oxidation step is lithium manganese oxide. The lithium manganese oxide powder is separated, and then dried to prepare dry powder. The dry powder is tired using a firing furnace such as an electric furnace for 2 or more hours and 24 or less hours. Atmosphere within the furnace at this time may be any environment in which oxygen is present. Such an environment can be realized by supplying air or the like into the furnace. The temperature at this time is preferably 500° C. or higher and 700° C. or lower for acceleration of crystallization.

3rd Embodiment

Figure 3:
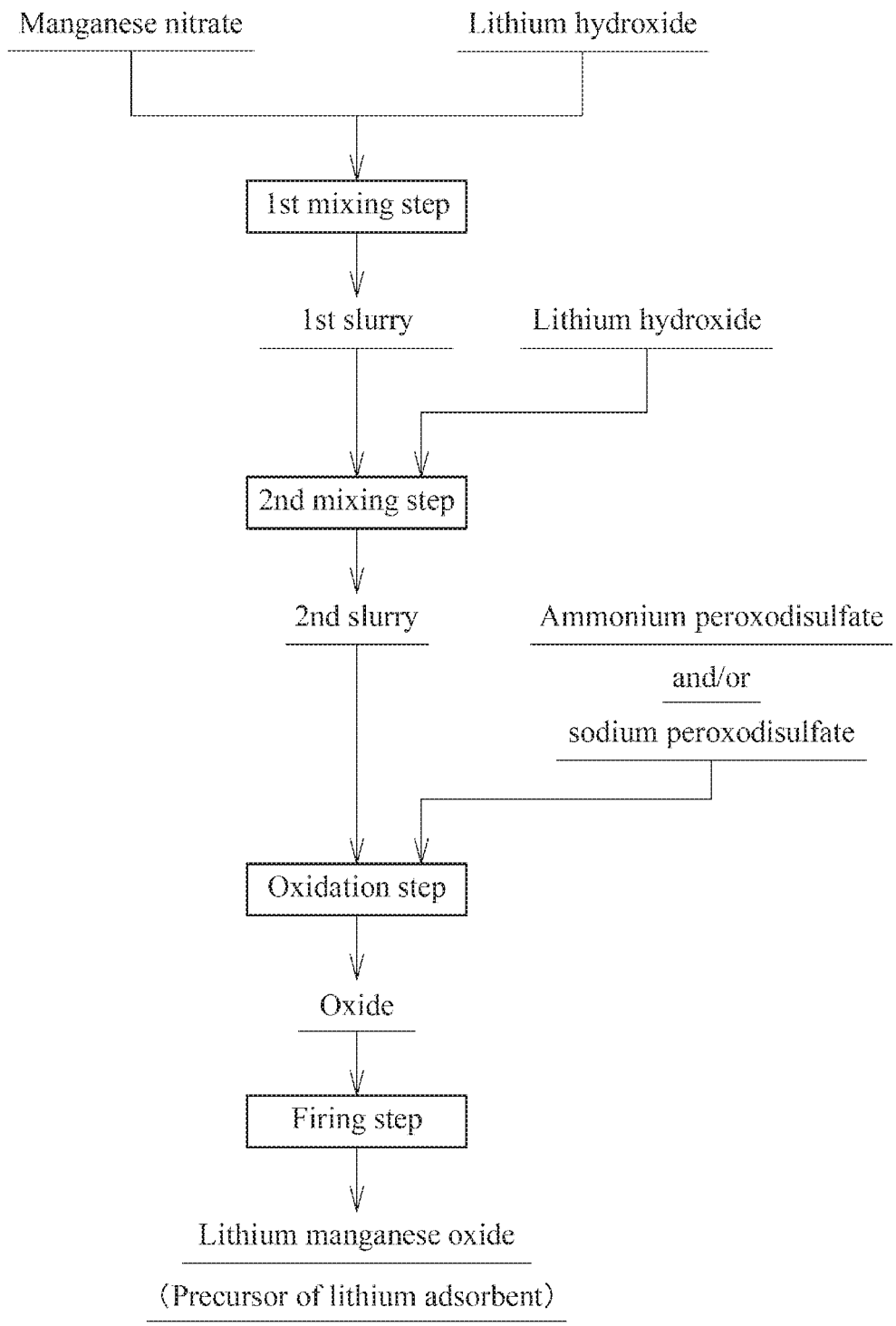
FIG. 3 is a flow chart showing the method for producing a precursor of a lithium adsorbent according to at $3^{rd}$ embodiment of the present invention.

FIG. 3 shows the method for producing a precursor of a lithium adsorbent according to the $3^{rd}$ embodiment of the present invention. As shown in FIG. 3, differences between the $1^{st}$ and the $3^{rd}$ embodiments are that substances to be mixed in the $1^{st}$ mixing step are different; the oxidizing agents in the oxidation step are different; and the oxidation step is followed by a firing step. Description of the 3° embodiment mentions only differences between the $1^{st}$ and the $3^{rd}$ embodiments. Hence, portions, descriptions of which are omitted herein, are the same as those in the $1^{st}$ embodiment.

<$1^{st}$ Mixing Step>

The $1^{st}$ mixing step involves mixing manganese nitrate and lithium hydroxide to obtain a $1^{st}$ slurry containing manganese hydroxide. Note that the $1^{st}$ slurry is obtained by mixing aqueous solutions in which manganese nitrate and lithium hydroxide have been dissolved, respectively, or, using a solution or an aqueous solution obtained by mixing solids such as reagents and then dissolving them in solvents such as water. In addition, a case of mixing aqueous solutions is described below.

A method for preparing an aqueous solution containing manganese nitrate and an aqueous solution containing lithium hydroxide is not particularly limited. For example, such an aqueous solution is prepared by dissolving a hydrate such as $Mn(NO_3)_2 \cdot 6H_2O$, or $LiOH \cdot H_2O$ in water.

The concentrations of both aqueous solutions are not particularly limited. However, the concentration should be at the same or lower than the solubility in order to prepare an aqueous solution. The solubility of manganese nitrate in water is about 140 g/100 g-water at 20° C. Similarly, the solubility of lithium hydroxide is about 12 g/100 g-water at 20° C. The concentrations of the aqueous solutions are determined in view of these solubilities.

An aqueous solution containing manganese nitrate and an aqueous solution containing lithium hydroxide are mixed, so that the $1^{st}$ slurry containing manganese hydroxide is obtained (see [Formula 3]).

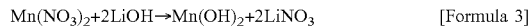

$$Mn(NO_3)_2 + 2LiOH \rightarrow Mn(OH)_2 + 2LiNO_3 \quad \text{[Formula 3]}$$

Note that the molar amount of the lithium hydroxide to be added is theoretically required to be 2 times the molar amount of the manganese nitrate. Hence, in order to reliably perform reaction, the molar amount of the lithium hydroxide is preferably an equivalent amount; that is, 2 or more times the molar amount of the manganese nitrate and 10 or less times the molar amount of the manganese nitrate.

<$2^{nd}$ Mixing Step>

The $2^{nd}$ mixing step involves adding lithium hydroxide to the slurry obtained in the $1^{st}$ mixing step, and then mixing the mixture to obtain a $2^{nd}$ slurry. After the manganese hydroxide is generated in the $1^{st}$ mixing step, lithium hydroxide is added as a lithium manganese oxide source. The lithium hydroxide may be added in the form of aqueous solution with no problem, but it is preferably added in the form of solid in order to prevent the liquid volume from increasing.

The Li/Mn ratio of the lithium manganese oxide having high adsorption capacity as a Li adsorbent is known to be 0.5 or more times and 1.0 or less times that of $LiMn_2O_4$. For example, the Li/Mn ratio of $Li_{1.33}Mn_{1.67}O_4$ is 0.8.

With respect to the molar amount of the manganese nitrate in the $1^{st}$ step, the molar amount of the lithium hydroxide should be determined in view of the above ratios. However, in order to reliably perform lithium intercalation, the molar amount of the lithium hydroxide in the $2^{nd}$ mixing step is preferably 10 or more times and 50 or less time the molar amount of the manganese nitrate used in the $1^{st}$ step.

<Oxidation Step>

The oxidation step involves adding ammonium peroxodisulfate and/or sodium peroxodisulfate to the $2^{nd}$ slurry obtained in the $2^{nd}$ mixing step to obtain an oxide. Note that the above ammonium peroxodisulfate and/or sodium peroxodisulfate may be added in the form of solid such as crystal or in the form of aqueous solution or the like in which ammonium peroxodisulfate and/or sodium peroxodisulfate is dissolved in advance.

The total molar amount of the ammonium peroxodisulfate (ammonium persulfate) and/or the sodium peroxodisulfate (sodium persulfate) to be added in the oxidation step is preferably 0.5 or more times and 5 or less times the molar amount of the manganese nitrate used in the $1^{st}$ mixing step. The amount of the ammonium peroxodisulfate is specified as described above, so that the total amount of the manganese nitrate used in the $1^{st}$ mixing step can be consumed to give the lithium manganese oxide.

Furthermore, an oxidizing agent(s), ammonium peroxodisulfate and/or sodium peroxodisulfate, is added to the $2^{nd}$ slurry kept at a temperature of 70° C. or higher, and preferably 80° C. or lower. The mixture is stirred under the conditions, and thus manganese in the solution is oxidized.

The reason of keeping the $2^{nd}$ slurry at the above temperature is that in the oxidation step, lithium manganese oxide is generated through lithium intercalation, and increasing the reaction temperature is effective to increasing the reaction rate. Pressure to be employed for the reaction may be atmospheric pressure with no problem, and there is no need to perform pressurization to increase the temperature to a level higher than 100° C. Moreover, stirring and mixing are preferably continued for 5 or more hours at the above temperatures for reliable generation of an oxide, lithium manganese oxide.

<Firing Step>

The firing step involves firing the oxide obtained in the oxidation step to obtain a precursor of a lithium adsorbent. The oxide obtained in the oxidation step is lithium manganese oxide. The lithium manganese oxide powder is separated, and then dried to obtain dry powder thereof, and then the dry powder is fired under an oxygen atmosphere using a firing furnace such as an electric furnace for 2 or more hours and 24 or less hours. The temperature for firing is preferably 500° C. or higher and 700° C. or lower for accelerating crystallization.

EXAMPLES

Hereinafter, specific examples of the method for producing a precursor of a lithium adsorbent of the present invention will be further described in detail, but the present invention is not limited by these examples.

Example 1

<Preparation of Precursor of Lithium Adsorbent>

Example 1 is an example of the $1^{st}$ embodiment. A 200-L heat-resistant Dailite tank was filled with about 100 L of water, 19.4 kg of powdery manganese sulfate monohydrate (manganese sulfate: 115 mol) was added thereto and then dissolved by stirring and mixing with an impeller. And then 20 kg of an aqueous caustic soda solution (sodium hydroxide: 240 mol) with a weight concentration of 48% was added thereto, thereby preparing a slurry of manganese hydroxide. Powdery lithium hydroxide monohydrate (19.3 kg) (lithium hydroxide: 460 mol) was added into the slurry of manganese hydroxide, and then the mixture was heated using a Teflon (registered trademark) heater while stirring and mixing, thereby adjusting the temperature of the slurry at 50° C. or higher.

Subsequently, an aqueous hypochlorous acid solution with a concentration by weight of 12% was added dropwise so that the oxidation-reduction potential was 300 mV or higher at a silver-silver chloride electrode. An aqueous hypochlorous acid solution (66 L) was required for the electrode to finally and stably exhibit the oxidation-reduction potential of 300 mV or higher. Under the condition, stirring and mixing were continued for 0.5 hours. During stirring and mixing, heating was continued using a Teflon (registered trademark) heater for keeping the temperature at 50° C. or lower. The oxidation-reduction potential during stirring and mixing was confirmed using an ORP meter with a glass electrode.

Black-colored powder was obtained by the procedure. After the completion of stirring, filtration by suction was performed using a Buchner funnel for solid-liquid separation, thereby collecting powder. The thus collected powder was washed with pure water to remove a liquid adhering thereto, and then dried in air for about 24 hours at 80° C. The weight of the lithium manganese oxide powder (a precursor of a lithium adsorbent) obtained after drying was 12 kg.

Figure 5:
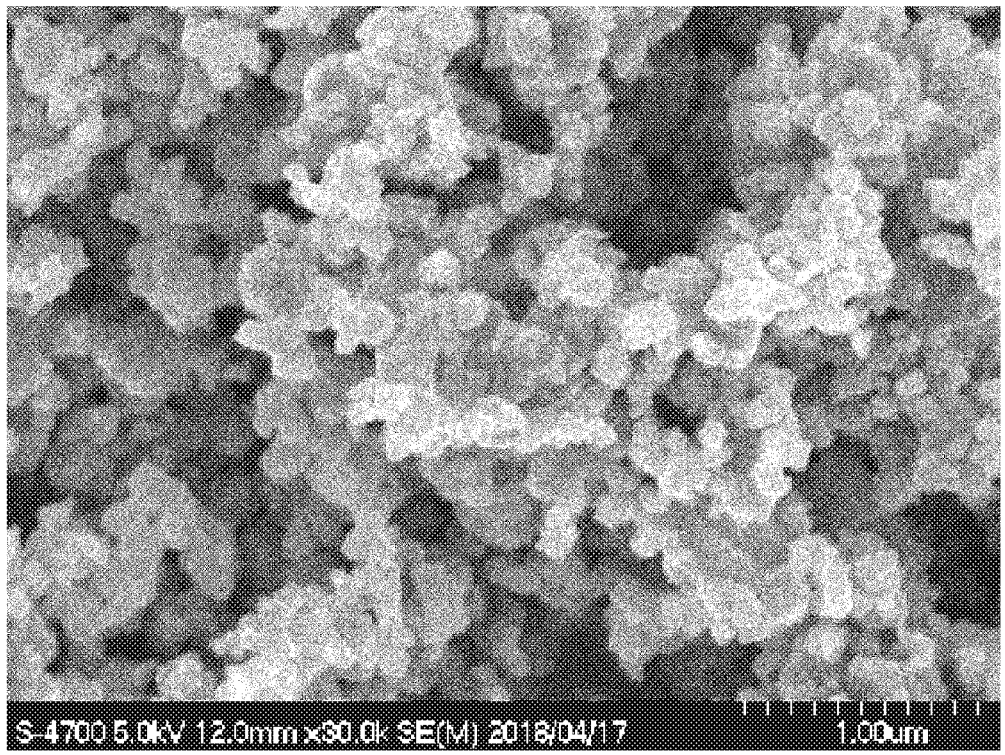
FIG. 5 is a scanning electron microscopic (SEM) image of a precursor of a lithium adsorbent, lithium manganese oxide, obtained in the production method in FIG. 1.

The result of analyzing the thus obtained precursor of the lithium adsorbent by XRD (X-ray diffraction) is shown in FIG. 4. As shown in FIG. 4, the presence of 4 peaks pointed by arrows indicates that $Li_{1.6}Mn_{1.6}O_4$ was obtained. Furthermore, the SEM image of the precursor of the lithium adsorbent is shown in FIG. 5. As shown in FIG. 5, the condition of the precursor of the lithium adsorbent can be understood.

<Preparation of Lithium Adsorbent (Acid Treatment)>

A portion (10 g) of the thus obtained precursor of the lithium adsorbent was separated and then added into a 200-mL beaker, and then 150 mL of an aqueous hydrochloric acid solution prepared at 1.0 mol/L through dilution of hydrochloric acid (Wako Pure Chemical Corporation) with pure water was added, followed by about 1 hour of mixing and stirring. After mixing and stirring, the slurry was filtered by suction using a Buchner funnel for solid-liquid separation, thereby collecting powder.

The collected powder was added again into a 200-mL beaker, and then 150 mL of an aqueous hydrochloric acid solution prepared at 1.0 mol/L was added, followed by about 1 hour of mixing and stirring. After mixing and stirring, the slurry was filtered by suction using a Buchner funnel for solid-liquid separation, thereby collecting powder. The thus collected powder was washed with about 500 mL of pure water to remove a liquid adhering thereto, and then dried using a dryer at 60° C. for about 24 hours in air. An adsorbent (7 g) was obtained by the procedure. The filtrate collected by solid-liquid separation was analyzed by ICP-AES, so as to find the liquation rate of lithium from the precursor. The liquation rate of lithium was about 78%.

<Adsorption of Lithium>

Lithium chloride, sodium chloride, magnesium chloride and potassium chloride (all produced by Wako Pure Chemical Corporation) were dissolved in pure water to prepare an aqueous solution with a lithium concentration of 5 g/L, a sodium concentration of 13 g/L, a magnesium concentration of 91 g/L, and a potassium concentration of 23 g/L. About 70 mL of the prepared aqueous solution and 7 g of the adsorbent prepared by acid treatment were added into a 200 mL beaker and then mixed and stirred. Since the pH of the aqueous solution decreases as lithium adsorption proceeds, a 8 mol/L aqueous sodium hydroxide solution (Wako Pure Chemical Corporation) was added during mixing and stirring to adjust the pH at pH 7.

Figure 6:
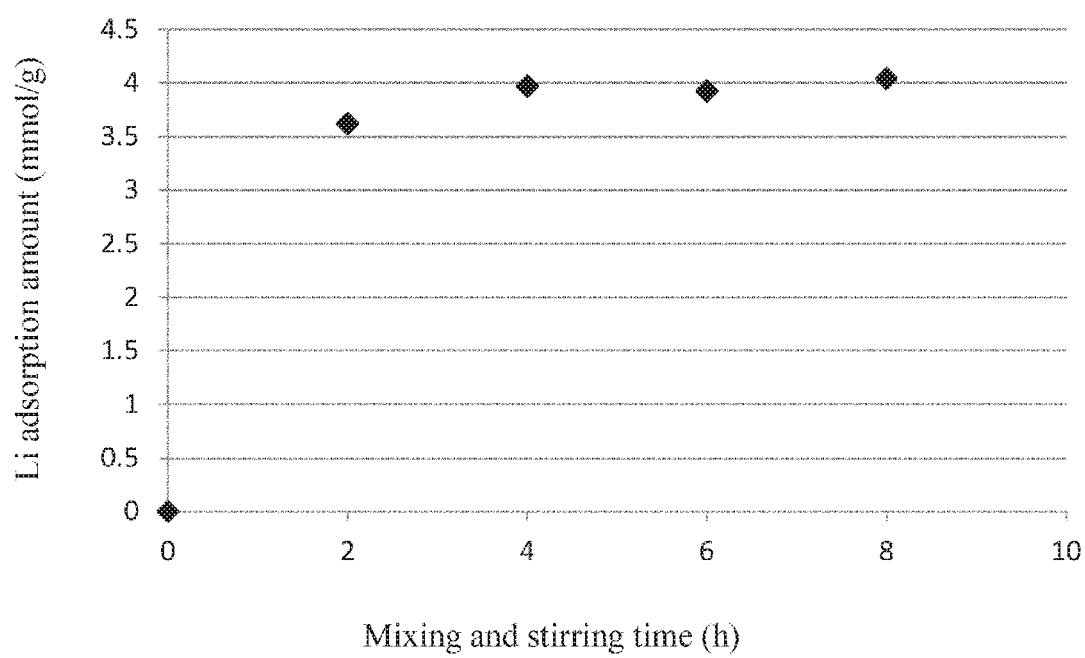
FIG. 6 is a graph showing the lithium adsorption amount of a precursor of a lithium adsorbent, lithium manganese oxide, obtained in the production method in FIG. 1, with respect to the mixing and stirring time.

After stirring and mixing, the slurry was filtered by suction using a Buchner funnel for solid-liquid separation, and then the lithium concentration in the filtrate was analyzed by ICP-AES, thereby finding the adsorption amount of lithium. The relationship between the time of stirring and mixing and the adsorption amount of lithium is shown in FIG. 6. In FIG. 6, the horizontal axis indicates time, and the vertical axis indicates the adsorption amount of lithium.

Since the exchange capacity of a general strong acid cation exchange resin is 2 mmol/g, successful production of the lithium adsorbent with high adsorption capability was confirmed.

Example 2

<Preparation of Precursor of Lithium Adsorbent>

Example 2 is an example of the $2^{nd}$ embodiment. Manganese sulfate pentahydrate (Wako Pure Chemical Corporation) (241 g) and 84 g of lithium hydroxide monohydrate were each dissolved in pure water to result in a volume of 1 L, thereby preparing an aqueous manganese sulfate solution (1.0 mol/L) and an aqueous lithium hydroxide solution (2.0 mol/L). The thus prepared aqueous solutions were added into 3-L beakers, and then stirred and mixed, thereby preparing a manganese hydroxide slurry ($1^{st}$ slurry). To the manganese hydroxide slurry, 420 g (10 mol) of solid lithium hydroxide monohydrate was added, and then stirring and mixing were continued ($2^{nd}$ slurry).

Subsequently, the $2^{nd}$ slurry was heated to 50° C., an industrial aqueous sodium hypochlorite solution with an effective concentration of 12% was added dropwise until the oxidation-reduction potential was about 400 mV as measured at the silver-silver chloride electrode. Subsequently, stirring and mixing were continued using a water bath at a temperature between 50° C. and 60° C. for about 5 hours. The thus obtained powder (oxide) appeared blackish brown. After stirring and mixing, vacuum filtration was performed, the powder was washed with pure water, and then vacuum-dried at ordinary temperature. The thus dried powder was pulverized in a mortar, and then fired in an oxidative atmosphere at 600° C. for 24 hours. After firing, about 103 g of a precursor of a lithium adsorbent; that is, the powder of lithium manganese oxide was obtained.

Figure 7:
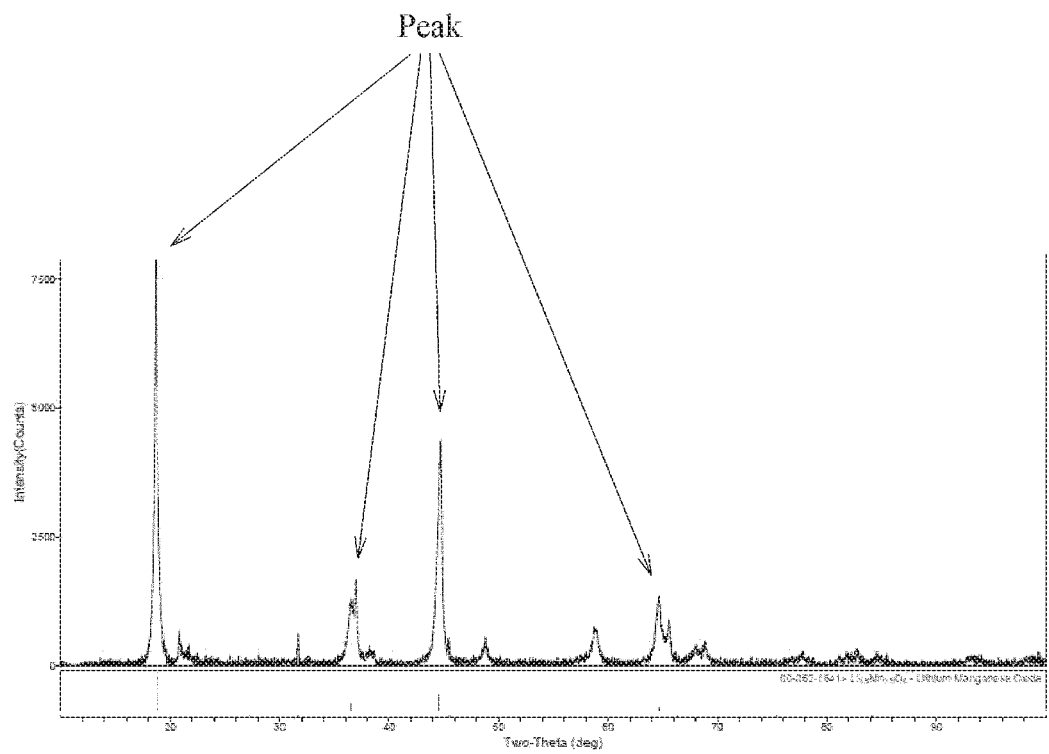
FIG. 7 is a graph showing the results of measuring X-ray diffraction of a precursor of a lithium adsorbent, lithium manganese oxide, obtained in the production method in FIG. 2.
Figure 8:
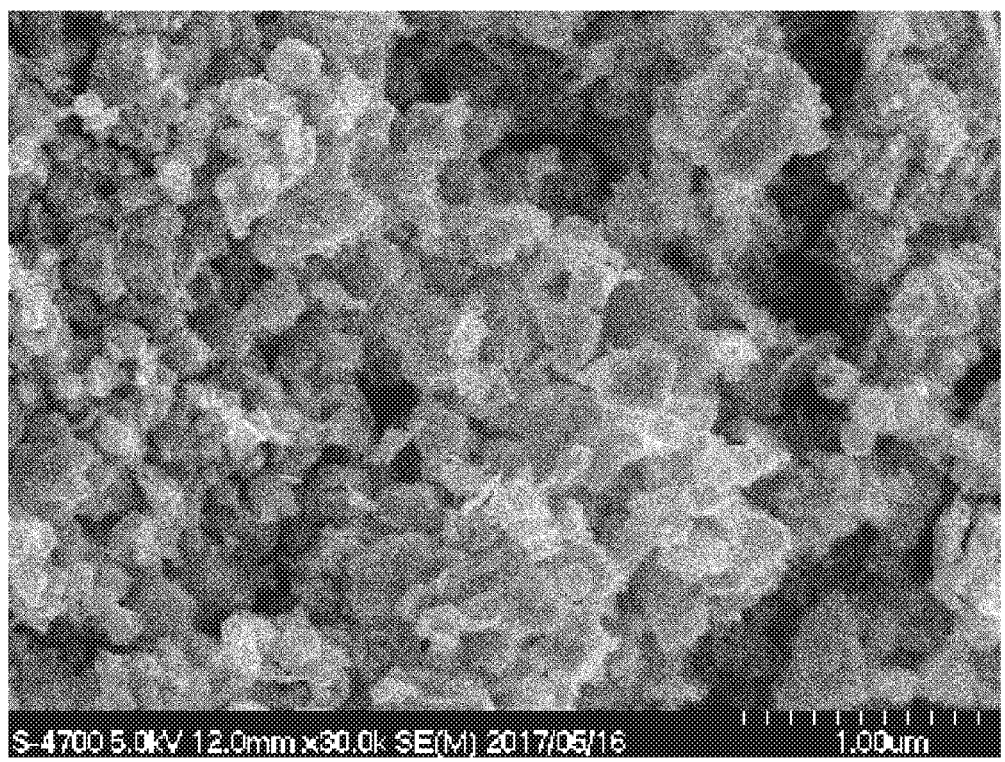
FIG. 8 is a scanning electron microscopic (SEM) image of a precursor of a lithium adsorbent, lithium manganese oxide, obtained in the production method in FIG. 2.

The result of analyzing the thus obtained precursor by XRD (X-ray diffraction) is shown in FIG. 7. As shown in FIG. 7, the presence of 4 peaks pointed by arrows indicates that $Li_{1.6}Mn_{1.6}O_4$ was obtained. Furthermore, the SEM image of the precursor of the lithium adsorbent is shown in FIG. 8. As shown in FIG. 8, the condition of the precursor of the lithium adsorbent can be understood.

<Preparation of Lithium Adsorbent (Acid Treatment)>

About 90 g of the obtained precursor of the lithium adsorbent was mixed and stirred with about 1400 mL of an aqueous hydrochloric acid solution (1 mol/L) in a 3-L beaker for about 1 hour. After nixing and stirring, the slurry was vacuum-filtered (solid-liquid separation), the filtrate and the powder were collected. The powder was dried using a dryer at 60° C. for 24 hours in air. This procedure was repeated twice to obtain a lithium adsorbent. The dry weight of the adsorbent collected after the procedure was about 80 g. The filtrate collected by solid-liquid separation was analyzed by ICP-AES, so that the liquation rate of lithium from the precursor of the lithium adsorbent was found. The lithium liquation rate was about 80%.

<Adsorption of Lithium>

Lithium chloride, sodium chloride, magnesium chloride and potassium chloride (all produced by Wako Pure Chemical Corporation) were dissolved in pure water to prepare an aqueous solution with a lithium concentration of 5 g/L a sodium concentration of 12 g/L, a magnesium concentration of 74 g/L, and a potassium concentration of 18 g/L. The prepared aqueous solution (800 mL) and 80 g of an adsorbent prepared in the above "Preparation of lithium adsorbent" were added into a 1-L beaker and then mixed and stirred. Since the pH of the aqueous solution decreases as lithium adsorption proceeds, a 8 mol/L aqueous sodium hydroxide solution (Wako Pure Chemical Corporation) was added during mixing and stirring to adjust the pH at pH 7.

After stirring and mixing, the slurry was filtered by suction using a Buchner funnel for solid-liquid separation, and then the lithium concentration in the filtrate was analyzed by ICP-AES, thereby finding the adsorption amount of lithium. The relationship between the time of stirring and mixing and the adsorption amount of lithium is shown in FIG. 9. In FIG. 9, the horizontal axis indicates time, and the vertical axis indicates the adsorption amount of lithium.

Since the exchange capacity of a general strong acid cation exchange resin is 2 mmol/g, successful production of the lithium adsorbent with high adsorption capability was confirmed.

Example 3

<Preparation of Precursor of Lithium Adsorbent>

Example 3 is an example of the $3^{rd}$ embodiment. Manganese nitrate hexahydrate (28.70 g) (Wako Pure Chemical Corporation), 11.41 g of ammonium peroxodisulfate (Wako Pure Chemical Corporation), 8.39 g of lithium hydroxide monohydrate (Wako Pure Chemical Corporation) were each weighed in beakers, and then dissolved in ion exchanged water. Each aqueous solution was then diluted to result in a volume of 100 ml, thereby preparing an aqueous manganese nitrate solution (1.0 mol/L), an aqueous lithium hydroxide solution (1.0 mol/L), and an aqueous ammonium peroxodisulfate solution (0.5 mol/L).

The total amount of the aqueous manganese nitrate solution (1.0 mol/L) was added into a Pyrex (registered trademark) 500-ml Erlenmeyer flask, and then the total amount of the aqueous lithium hydroxide solution (1.0 mol/L) was added dropwise while stilling with a stirrer ($1^{st}$ mixing step). With further mixing and stirring, 41.96 g of solid lithium hydroxide monohydrate was added to make a slurry ($2^{nd}$ mixing step).

Next, the slurry was heated to 85° C. with a hot stirrer, and then the total amount of the aqueous ammonium peroxodisulfate solution (0.5 mol/L) was added dropwise to the slurry (oxidation step). Thereafter, stilling and mixing were continued while maintaining the temperature at 85° C. for 10 hours. The thus obtained powder appeared brown.

After the completion of stirring, filtration by suction was performed using a Buchner funnel for solid-liquid separation. The thus collected powder was washed with ion exchanged water to remove a liquid adhering thereto, and then vacuum-dried for about 12 hours at 120° C. The thus dried powder was pulverized in a mortar and then fired in an oxidative atmosphere at 600° C. for 24 hours (firing step).

Figure 10:
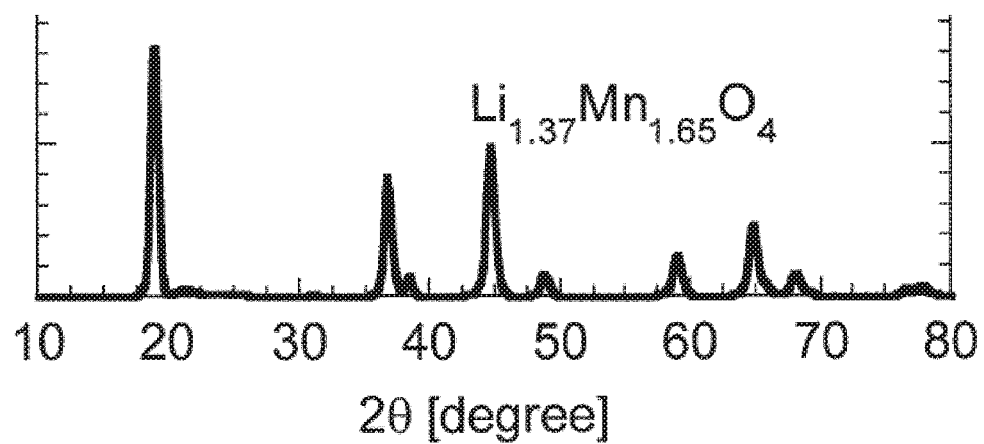
FIG. 10 is a graph showing the results of measuring X-ray diffraction of a precursor of a lithium adsorbent, lithium manganese oxide, obtained in the production method in FIG. 3.
Figure 11:
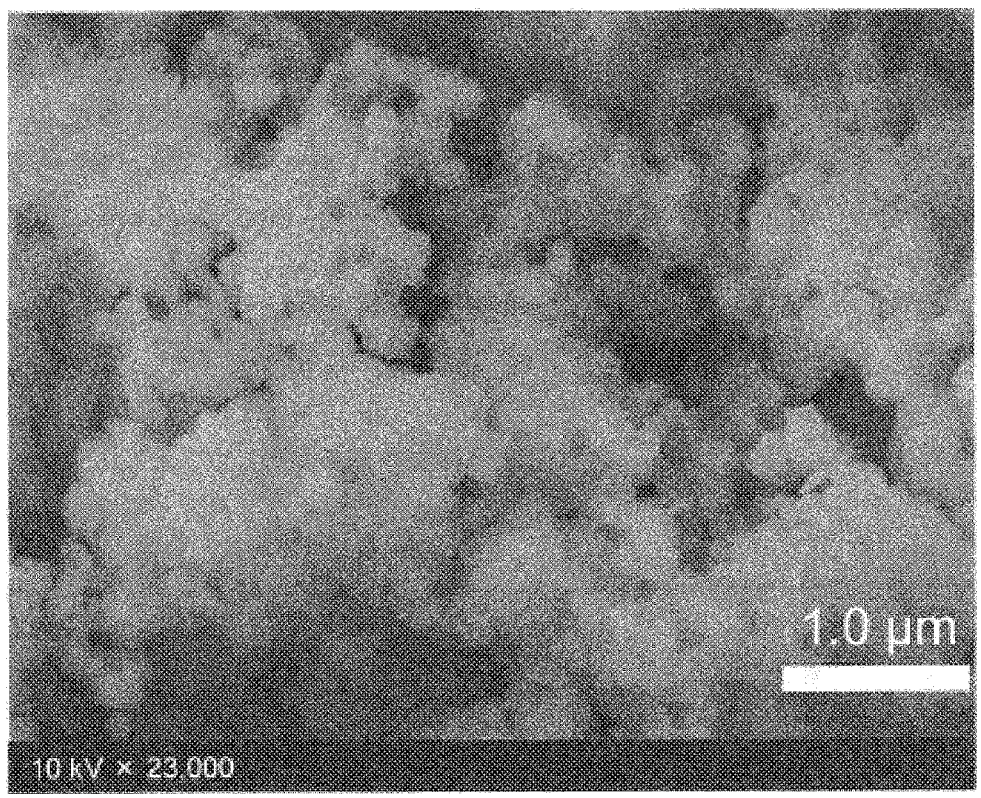
FIG. 11 is a scanning electron microscopic (SEM) image of a precursor of a lithium adsorbent, lithium manganese oxide, obtained in the production method in FIG. 3.

The result of analyzing the thus obtained precursor by XRD (X-ray diffraction) is shown in FIG. 10. As shown in FIG. 10, $Li_{1.37}M_{1.65}O_4$ was obtained. Furthermore, the SEM image of the precursor is shown in FIG. 11. As shown in FIG. 11, the condition of the obtained precursor of the lithium adsorbent can be understood.

<Preparation of Lithium Adsorbent (Acid Treatment)>

Next, 1.0 g of the precursor was weighed in an Erlenmeyer flask, 500 mL of 1.0 mol/L hydrochloric acid (Wako Pure Chemical Corporation) was added, followed by 24 hours of shaking at 160 rpm. Subsequently, filtration by suction was performed, separately collecting a filtrate and powder. The thus collected powder was washed with ion exchanged water, and then dried with a vacuum dryer for 5 hours. The procedure was repeated twice, so that a lithium adsorbent was obtained. The filtrate was analyzed by AAS (Atomic Absorption Spectrometry), so that the liquation rate of lithium from the precursor was found. The lithium liquation rate was 100%.

<Adsorption of Lithium>

Figure 12:
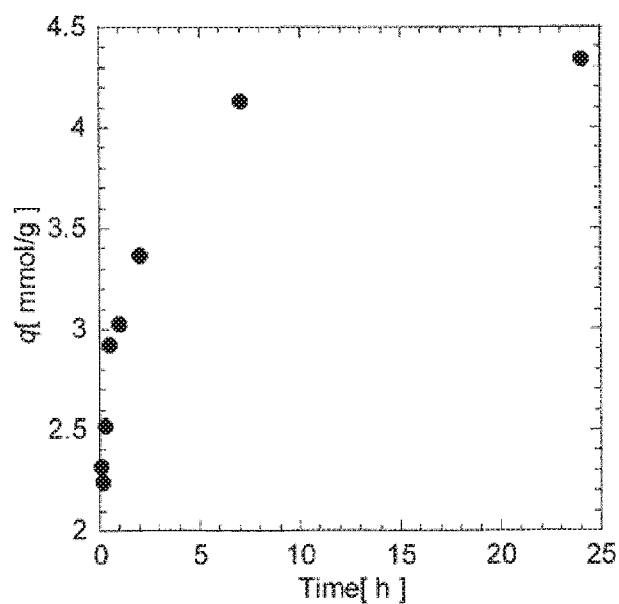
FIG. 12 is a graph showing the lithium adsorption amount of a precursor of a lithium adsorbent, lithium manganese oxide, obtained in the production method in FIG. 3, with respect to the shaking time.

A buffer solution prepared to have a pH ranging from 8.5 to 8.6 using ammonium chloride and a 25% aqueous ammonia solution was mixed with 0.1356 g of lithium chloride. The mixture was diluted to result in a volume of 200 mL, thereby preparing an aqueous lithium chloride solution (16 mol/L). The aqueous lithium chloride solution (10 mL) and 0.01 g of an adsorbent that had been subjected to acid treatment were added into a 50-mL Erlenmeyer flask, and then the resultant was subjected to shaking at 160 rpm with the penetration time set at 5 minutes, 10 minutes, 15 minutes, 30 minutes, 1 hour, 2 hours, 7 hours, and 24 hours. After shaking, filtration was performed, and then the lithium concentration in the filtrate was measured by AAS to find the Li adsorption amount. The lithium adsorption amount with respect to the time of shaking is shown in FIG. 12. In FIG. 12, the horizontal axis indicates time, and the vertical axis indicates the adsorption amount of lithium.

Since the exchange capacity of a general strong acid cation exchange resin is 2 mmol/g, successful production of the lithium adsorbent with high adsorption capability could be confirmed.

The invention claimed is:

1. A method for producing a precursor of a lithium adsorbent comprising steps (1) to (3):
   (1) a 1st mixing step: the step of mixing a manganese salt and alkali hydroxide to obtain a 1st slurry containing manganese hydroxide;
   (2) a 2nd mixing step: the step of adding lithium hydroxide to the 1st slurry, and mixing the mixture to obtain a 2nd slurry;
   (3) an oxidation step: the step of adding an oxidizing agent to the 2nd slurry to obtain an oxide, wherein the oxidizing agent is sodium hypochlorite.

2. The method for producing a precursor of a lithium adsorbent according to claim 1, further comprising a step of firing the oxide after the oxidation step, wherein the step of firing the oxide is performed at 500° ° C. to 700° ° C. for 2 to 24 h.

3. A method for producing a precursor of a lithium adsorbent comprising steps (1) to (3):
   (1) a 1st mixing step: the step of mixing a manganese salt and alkali hydroxide to obtain a 1st slurry containing manganese hydroxide;

(2) a 2nd mixing step: the step of adding lithium hydroxide to the 1st slurry, and mixing the mixture to obtain a 2nd slurry;
(3) an oxidation step: the step of adding an oxidizing agent to the 2nd slurry to obtain an oxide, and further comprising a step of firing the oxide after the oxidation step, wherein the step of firing the oxide is performed at 500° ° C. to 700° ° C. for 2 to 24 h.

* * * * *